US012643562B2

(12) United States Patent
Šoštarić et al.

(10) Patent No.: US 12,643,562 B2
(45) Date of Patent: Jun. 2, 2026

(54) DRIVING MODES CONTROL AND MANAGEMENT SYSTEM/DEVICE FOR A VEHICLE

(71) Applicant: Bugatti Rimac LLC, Sveta Nedjelja (HR)

(72) Inventors: David Šoštarić, Čakovec (HR); Rok Marič, Ljutomer (SI); Timotheus van Pelt, Rotterdam (NL); Tomislav Šimunić, Gornja Bistra (HR)

(73) Assignee: Bugatti Rimac LLC, Sveta Nedjelja (HR)

( * ) Notice: Subject to any disclaimer, the term of this patent is extended or adjusted under 35 U.S.C. 154(b) by 181 days.

(21) Appl. No.: 18/526,763

(22) Filed: Dec. 1, 2023

(65) Prior Publication Data

US 2024/0101132 A1     Mar. 28, 2024

Related U.S. Application Data

(63) Continuation-in-part of application No. 18/334,646, filed on Jun. 14, 2023.

(30) Foreign Application Priority Data

Jun. 14, 2022    (EP) ..................................... 22178823
Dec. 14, 2022    (EP) ..................................... 22213429

(51) Int. Cl.
B60W 50/08        (2020.01)
B60L 3/08         (2006.01)
                       (Continued)

(52) U.S. Cl.
CPC ............. B60W 50/082 (2013.01); B60L 3/08 (2013.01); B60W 30/182 (2013.01);
                       (Continued)

(58) Field of Classification Search
None
See application file for complete search history.

(56)                    References Cited

U.S. PATENT DOCUMENTS 12,116,047 B1 *  10/2024  Yeomans ............. B62D 35/005
2018/0111650 A1 *  4/2018  Swantick ............. B62D 35/005
                    (Continued)

FOREIGN PATENT DOCUMENTS

DE        102017007145 B4 *  12/2021  ............ F16F 7/1028

OTHER PUBLICATIONS

Ahangarnejad et al., "Integrated Vehicle Dynamics System Through Coordinating Active Aerodynamics Control, Active Rear Steering, Torque Vectoring and Hydraulically Interconnected Suspension", International Journal of Automotive Technology, vol. 20, No. 5, pp. 903-915 (Year: 2019).*

*Primary Examiner* — Amelia Vorce
(74) *Attorney, Agent, or Firm* — Dennemeyer & Associates LLC

(57)                    ABSTRACT

A vehicle, a method of controlling a vehicle, and a non-transitory computer readable storage medium are described. The vehicle can comprise a management and control system associated to onboard systems and/or to a driving input interface and/or to the engine and/or powertrain and/or to at least one wheel and/or to the chassis. The management and control system can: determine aggregated command outputs; detect one or more dynamic parameters exceeding a threshold safety value; selectively prioritize each of the aggregated command outputs based on one or more of the dynamic parameters to change from a user-selected driving mode to a safety driving mode; and change the prioritized safety driving mode back to the user-selected driving mode in response to the one or more of the dynamic parameters no longer exceeding the threshold safety value.

20 Claims, 6 Drawing Sheets

(51) Int. Cl.

| | | |
|---|---|---|
| *B60W 30/182* | (2020.01) | |
| *B60W 50/00* | (2006.01) | |
| *B62D 35/00* | (2006.01) | |
| *B62D 37/02* | (2006.01) | |

(52) U.S. Cl.
CPC ....... *B60W 50/0098* (2013.01); *B62D 35/005* (2013.01); *B62D 35/007* (2013.01); *B62D 35/008* (2013.01); *B62D 37/02* (2013.01); *B60W 2520/00* (2013.01)

(56) References Cited

U.S. PATENT DOCUMENTS

| | | | |
|---|---|---|---|
| 2023/0038657 A1* | 2/2023 | Bartels ................. | B62D 35/005 |
| 2023/0075522 A1* | 3/2023 | Kwon .................. | B60K 11/085 |
| 2023/0264762 A1* | 8/2023 | Allmandinger ........ | B62D 37/02 |
| | | | 701/2 |
| 2023/0339553 A1* | 10/2023 | Yoon ..................... | B62D 37/02 |
| 2024/0199050 A1* | 6/2024 | Kuehner .......... | B60W 60/0053 |

* cited by examiner

100

200 determining aggregated command outputs, each of the aggregated command outputs comprising a set of command parameters that control the plurality of onboard systems, the driving input interface, the at least one engine or powertrain, wheels, and chassis, wherein each set of command parameters corresponds to a driving mode, including user-selected driving mode and a plurality of safety driving modes　　210 detecting one or more dynamic parameters including: a current vehicle movement, overall status, and/or condition　　220 selectively prioritizing each of the aggregated command outputs based on one or more of the dynamic parameters exceeding a threshold safety value, the vehicle command parameters being changed according to the prioritization of the aggregated command outputs to change from a user-selected driving mode to one of the plurality of safety driving modes　　230 changing, in response to the one or more of the dynamic parameters no longer exceeding the threshold safety value, the vehicle command parameters from the prioritized safety driving mode to the user-selected driving mode　　240

FIG. 2

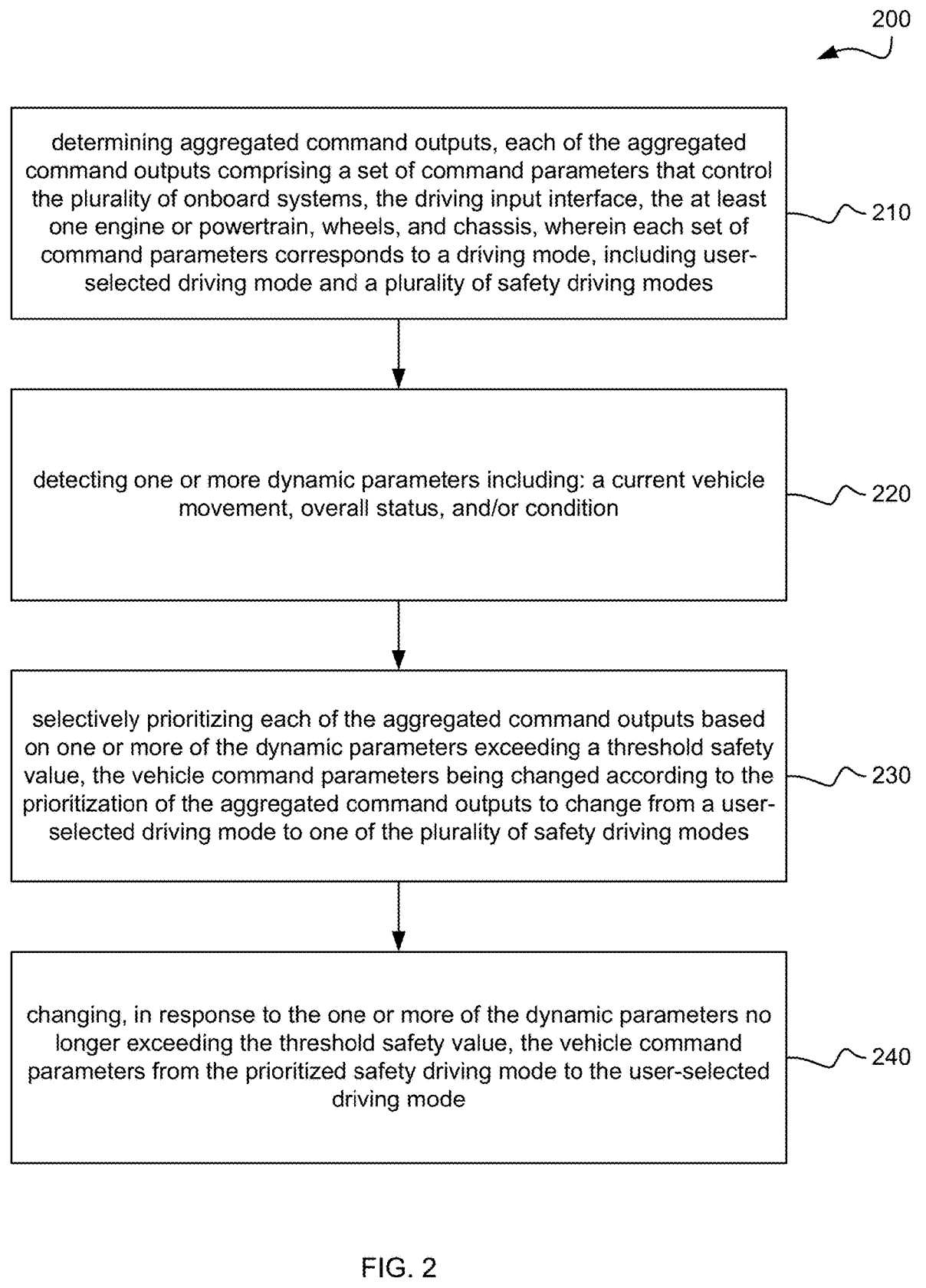

DRIVING MODES CONTROL AND MANAGEMENT SYSTEM/DEVICE FOR A VEHICLE

CROSS-REFERENCE TO RELATED APPLICATION

This application is a continuation-in-part of U.S. application Ser. No. 18/334,646, filed Jun. 14, 2023, which claims priority to European Patent Application No. 22178823.5, filed Jun. 14, 2022. This application also claims priority to European Patent Application No. 22213429.8, filed Dec. 14, 2022. The entire disclosures of the aforementioned applications are incorporated herein by reference.

TECHNICAL FIELD

The present application is related to a vehicle, e.g., an automobile or any other kind of means of transportation, having one or more "onboard systems" devoted to various driving government and/or performance provisions, and being functionally linked to suitable management and control system dedicated to the implementation of the harmonization of the operative conditions of such onboard systems.

BACKGROUND

It is known in the art that modern vehicles can be "configured" in various driving (or riding) modes in order to better cope with environmental conditions (rough or low grip travelling surfaces, extreme temperatures and so on) or to express a predetermined level of dynamic performance (maximum energetic efficiency, maximum longitudinal speed, improved handling in a twisty road and so on): in order to define such driving modes, which are usually inputted by the vehicle user/driver, the onboard electronics provide for a suitable number of command parameters to be sent to one or more onboard vehicle systems (powertrain, gearbox, suspension, energy charge and storage system and so on) in order to set their working conditions according to the parameters and to the user/driver selection of a given driving mode.

Usually, after a given driving mode is selected and implemented on a vehicle, the configurations of the various onboard systems affected by that selection are steadily kept over time, and eventually a default driving mode can be restored only after a vehicle shutdown and subsequent start-up (even if in some cases, a given selected driving mode is kept as "default" even after shutdown and re-start of the vehicle itself), while eventual safety systems like ABS or ESC continue their monitoring (and, if required, correcting/intervening) routine in parallel to the driving mode selector: otherwise stated, the dynamic safety controls of a typical known art vehicle do not change the selected driving mode without consent of the user/driver.

The aforementioned prior art, despite being largely spread in the automotive sector, has some non-negligible advantages, in particular in association with electrically-powered vehicles (EVs) and even more in detail when it comes to optimization of the vast array of onboard systems of high- (or very-high) performance cars.

Actually, high-performance EVs are usually characterized by a performance envelope wherein a huge amount of power and torque is available and, being capable to produce such huge amounts of power and torque demanded by one or more electric motors, wherein a large battery pack (with high capacity and corresponding high capability of charge and/or discharge current/power) is installed onboard: the peculiar combination of the performance envelope and of all the onboard systems requested for the optimal management of the power, torque and current/power charge and discharge makes such a kind of vehicle much more critical in terms of correct avoidance of potentially catastrophic failures while at the same time granting actual access to the very high performances of the vehicle itself (e.g. top speeds well above 300 km/h or turning capabilities that allow for centrifugal accelerations of 2 g and even more).

In such a combination of factors, the intrinsic separation between the activity of the dynamic safety system/features such as ABS, ESC or TCS and the driving mode selection may lead to critical situations which develop in very short times and which may lead to critical failures, e.g., related to a sudden overheating of the battery pack (due for example to a request for sudden acceleration or sustained very high speed, or even due to a large "spike" of recharging current coming to the battery as a consequence of a regenerative braking action starting from a very high speed) or related to loss of control of the vehicle during very high speed maneuvers as a consequence of "incompatibility" of a selected driving mode with the feedback of one or more vehicle's systems which is "forced" and kept fixed by the driving mode (fixed!) selection.

SUMMARY

Having stated the prior art drawbacks, it's therefore an object of the present invention to provide a vehicle and a related "integrated control and management system", such a system being suitably comprised with management and control system which can overcome the aforementioned drawbacks, and which is mainly capable of achieving an autonomous (or an intrinsic-safety or fail-safe) logic in order to both cope with one or more user/driver defined selection of driving modes and to ensure a highly optimized management of the vehicle and of all of its systems in order to preserve them from failures while at the same time maintaining the maximum performance output possible and granting a safe level of dynamic control so as to avoid crashes or non-recoverable driving errors (for example, driving errors consisting in unsuitable inputs coming from the user/driver).

At the same time, the present invention aims to provide a so-called driving modes prioritization system, and therefore to a vehicle having such a driving modes prioritization system, which is capable of intervening on very different onboard systems (provided that they have the capability of being configured "in real time" in one or more of their operating parameters) while remaining fully compatible with the known onboard networks dedicated to the data flow and/or exchange such as the so-called CAN-bus or the like.

According to an embodiment of the present disclosure, a vehicle can comprise a chassis supporting wheels, at least one of the wheels being a driving wheel and at least one of the wheels being a maneuvering wheel. At least one engine or powertrain can be supported by the chassis and linked to the driving wheel and/or to a driving axle. The vehicle can also comprise a plurality of onboard systems dedicated to motion control of the vehicle and/or to determine or affect dynamic parameters of the vehicle during its movement, the plurality of onboard systems including an active aerodynamics system configured to alter an aerodynamic state of the vehicle during movement of the vehicle; and a driving input interface interfaceable with a user of the vehicle or with an autonomous guidance system.

A vehicle according to embodiments of the present disclosure can also include a management and control system configured to: determine aggregated command outputs, each of the aggregated command outputs comprising a set of command parameters that control the plurality of onboard systems, the driving input interface, the at least one engine or powertrain, wheels, and chassis, wherein each set of command parameters corresponds to a driving mode, including a user-selected driving mode and a plurality of safety driving modes; detect one or more dynamic parameters including: a current vehicle movement, overall status, and/or condition; selectively prioritize each of the aggregated command outputs based on one or more of the dynamic parameters exceeding a threshold safety value, the vehicle command parameters being changed according to the prioritization of the aggregated command outputs to change from a user-selected driving mode to one of the plurality of safety driving modes, corresponding to a prioritized safety driving mode; and change, in response to the one or more of the dynamic parameters no longer exceeding the threshold safety value, the vehicle command parameters from the prioritized safety driving mode to the user-selected driving mode. When the vehicle is in the user-selected driving mode, the active aerodynamics system of the vehicle is in a first aerodynamic state. Furthermore, when the vehicle is in the prioritized safety driving mode, the active aerodynamics system is in a second aerodynamic state, the second aerodynamic state differing from the first aerodynamic state.

In addition to the above-described vehicle, the present disclosure can also provide for a method of controlling a vehicle. According to certain embodiments, a method of controlling a vehicle can generally comprise the functional steps described above in relation of the management and control system of a vehicle. According to yet another embodiment, the present disclosure describes a non-transitory computer readable storage medium storing instructions that, when executed by one or more processors, cause the one or more processors to perform the aforementioned method.

These aims, along with other technical advantages, will be illustrated and achieved by a driving modes prioritization system according to the present invention as described and claimed hereinafter.

BRIEF DESCRIPTION OF THE DRAWINGS

The advantages and features of the present invention will become better understood with reference to the following detailed description and claims taken in conjunction with the accompanying drawings, wherein like elements are identified with like symbols, and in which:

FIG. 2 is a flowchart of a method according to an embodiment of the present disclosure;

DETAILED DESCRIPTION

The driving modes prioritization system according to the invention is structurally and functionally integrated in a vehicle, and such vehicle basically comprises the following hardware components:

a chassis hosting a given number of wheels (e.g., four wheels for a "traditional" car), wherein at least one of such wheels is a driving wheel and wherein at least one of these wheels is a maneuvering (or "steering" or even "steerable") wheel;

at least one engine (e.g., a conventional endothermal engine or an electric engine) or a so-called "powertrain" located in the chassis and linked to the aforementioned at least driving wheel and/or to a driving axle comprising at least two driving wheels;

a plurality of "onboard systems" dedicated to motion control of the vehicle and/or to determine or affect dynamic parameters of the vehicle during its movement (examples of such onboard systems may not limitedly encompass steering racks, suspensions, active aerodynamics located in various body parts of the vehicle and so on); and a "driving input interface", including (but not limited to) a steering wheel and a set of driving pedals and/or levers and/or suitably ergonomically-shaped tools (such as handbrakes, brake bias selectors/regulators and so on) interfaceable with a user/driver of the vehicle or with an autonomous guidance system.

Advantageously, the driving modes prioritization system according to the invention also comprises a control system (which can be complementarily constituted by hardware, such as one or more controllers, and/or software components) associated to one or more the aforementioned onboard systems and/or to the driving input interface and/or to the one or more engines and/or powertrain and/or to at least one wheel and/or to the chassis intended herein, in the wording of the invention, as the "base platform" whereupon all the aforementioned onboard systems are mounted.

Figure 1:
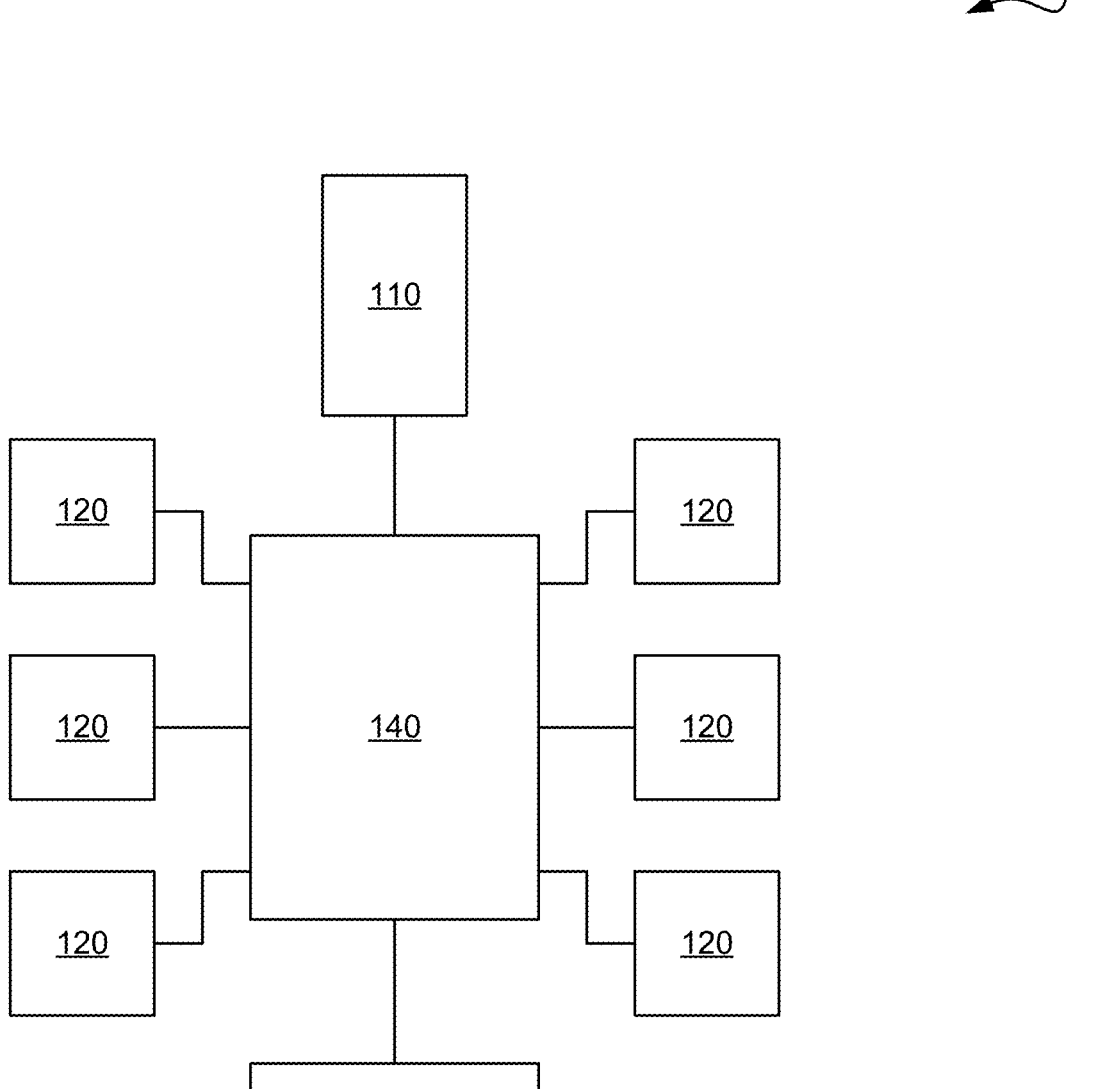
FIG. 1 is a schematic diagram of a control system according to an embodiment of the present disclosure.

With reference to FIG. 1, the control system (100) may comprise one or more controllers (140) in electronic communication with the engine/powertrain (110), the plurality of onboard systems (120), and the driving input interface (130).

The control system (100) may be capable of performing the following functions:

determining a multiplicity of so-called "aggregated command outputs", wherein one of such aggregated command outputs comprising one or more command parameters and defining an overall vehicle configuration status/mode;

detecting one or more dynamic parameters relating to a vehicle movement and/or overall status and/or condition; and selectively prioritize each of the aggregated command outputs conditionally on the fact that one or more of the detected dynamic parameters are exceeding a threshold and/or a minimum or a maximum safety value, in a way that the vehicle command parameters undergo a substantial change according to the just cited prioritization of the aggregated command outputs.

With reference to FIG. 2, the control system may perform a control method (200) comprising the following steps:

At step 210, aggregated command outputs are determined, each of the aggregated command outputs comprising a set of command parameters that control the plurality of onboard systems, the driving input interface, the at least one engine or powertrain, wheels, and chassis, wherein each set of command parameters corresponds to a driving mode, including user-selected driving mode and a plurality of safety driving modes;

At step 220, one or more dynamic parameters are detected, including: a current vehicle movement, overall status, and/or condition;

At step 230, each of the aggregated command outputs are selectively prioritized based on one or more of the dynamic parameters exceeding a threshold safety value, the vehicle command parameters being changed according to the prioritization of the aggregated command outputs to change from a user-selected driving mode to one of the plurality of safety driving modes; and At step 240, in response to the one or more of the dynamic parameters no longer exceeding the threshold safety value, the vehicle command parameters are changed from the prioritized safety driving mode to the user-selected driving mode.

Otherwise stated, the management and control system are "self-organized", from a computational capability standpoint, to recognize a whole range of different driving modes (each of this driving modes is made up by a suitable set of command parameters which are sent as "inputs" to the various onboard systems by choice of the user/driver of the vehicle itself) and to give a preference—or a more aptly defined "priority"—order to such a range of driving modes, and they are also adapted/capable to bypass the user/driver choices if they find that a given driving mode is incompatible (or generates insufficient qualitative and quantitative driving correction feedback) with a given situation occurring to the vehicle (e.g., overheating of the battery pack, excessive recharging of the battery pack, approaching to a bend/corner with a low downforce but with an excessive speed and so on).

Otherwise stated, the management and control system according to the invention can give autonomously to the vehicle an "ideal" driving mode which enables all the onboard systems—and the dynamic safety controls such as the ABS or the ESC, as well—to work with minimum reaction time and maximum precision of intervention.

It is also to be observed that the management and control system according to the invention can be set up in order to have a "fixed" order of prioritization for a given range of driving modes, and this fixed order can be implemented (e.g., by way of suitable software or firmware programming) according to a given logic which for example can be the maximization of the battery pack efficiency or the minimization of harmful heat generation (or, as a further example, the maximization of the driver and passenger protection in terms of possible impacts and/or inertial decelerations imparted to their bodies), or such prioritization order can be dynamically variable as a function of one or more "environmental" and/or "driving dynamics" measurements: in this possible—yet not limiting—embodiment, the management and control system may also comprise, mainly from a software standpoint, specific sub-routines or programs which determine and/or vary the order of preference/prioritization of the driving modes available to the user/driver of the vehicle.

Delving deeper into details, it can be observed that the aggregated command outputs are capable of determining, typically (but not limitedly to) in a decreasing priority value sequence, one and/or more of the following vehicle driving modes (or "driving stati" according to the wording used in the present invention):

a "failure" status/mode wherein one or more the dynamic parameters are exceeding, above or below, a respective safety threshold value (in this failure status/mode the aggregated command outputs are adapted to bring the vehicle to a dynamic condition of maximum stability and/or minimum or zero acceleration and/or minimum or zero travelling speed and/or minimum or zero torque (or power) output and/or minimum heat generation);

an "airbrake" status/mode wherein at least a vehicle speed is equal to or greater than a given threshold speed and/or wherein the vehicle is temporarily adapted to generate a higher aerodynamic drag and aerodynamic downforce (such an aerodynamic drag can be considered as an "overall" aerodynamic drag generated diffusely on the entire vehicle body or it can be considered exclusively to be a "front" aerodynamic drag, on a front axle of the vehicle, or a "rear" aerodynamic drag on a rear axle of the vehicle) within a predetermined amount of time and with respect to a status/mode from which the vehicle itself is temporarily re-configured;

a "thermal control" status/mode wherein at least a temperature of a vehicle component (e.g., a battery pack temperature and/or an inverter temperature and/or a motor temperature and/or a service fluid temperature and/or a gearbox temperature) is equal to or lesser than greater than a respective threshold value;

a "high speed status/mode" wherein the vehicle is adapted to generate a lowest—or minimum—aerodynamic drag (as already stated before, the lowest aerodynamic drag can be considered as generated by the whole vehicle body or it can just be considered as a front aerodynamic drag or a rear aerodynamic drag) while the downforce is being mutually balanced on a front axle of the vehicle and on a rear axle of the vehicle, and/or to reach its maximum practical speed;

a "DRS status/mode" wherein the vehicle is temporarily adapted to generate a lower overall aerodynamic drag (such a lower and temporary aerodynamic drag can be considered as being a front aerodynamic drag and/or a rear aerodynamic drag) within a predetermined amount of time and with respect to a status/mode from which the vehicle itself is temporarily re-configured;

a "stability" status/mode wherein the command parameters are set in order to minimize a vehicle reaction or dynamic feedback to a disturbance generated by an environment in which the vehicle is moving and/or caused by a user/driver (e.g., a bump or cavity in the ground on which the vehicle is running, or a sudden variation of the friction factor of such driving ground, or sudden oversteer by the driver);

an "efficiency" status/mode wherein the command parameters are set in order to maximize a vehicle's range and/or to minimize a consumption of a vehicle's energy source or accumulating unit;

a "cruise" user/driver defined status/mode wherein the command parameters are set in order to set and/or maintain a vehicle's cruise speed;

a "maximum maneuvering" mode wherein the command parameters are set in order to maximize a responsiveness of the vehicle to the user/driver's inputs and/or wherein a mechanical grip between at least one wheel and a surface run over by the vehicle during its movement is maximized and/or wherein a rotational speed around at least one axis of said vehicle is maximized (such an axis can for example be a yaw axis) and/or wherein a maximum aerodynamic downforce is acting on the vehicle during its movement;

a "drift" user/driver defined status/mode wherein the command parameters are set in order to determine and/or maintain a controlled sliding of a rear axle and/or a front axle of the vehicle;

an "autonomous drive" status/mode wherein the aggregated command outputs are determined by said autonomous guidance system (and typically in cooperation with the management and control system);

a "custom" user/driver defined status/mode wherein one or more, and preferably all of said command parameters are selectively determined by user/driver's inputs; and a "track and/or racetrack" user/driver defined status/mode wherein the command parameters are set in order to maximize a vehicle's dynamic performance along a given path or circuit (for example, such a track and/or racetrack status/mode can be defined as a parametric combination of one or more of the preceding stati/ modes).

In order to get a complete capability of detection of the vehicle conditions and running set-up, said dynamic parameters used as inputs for calculation/determination of the priority-based selection of the most suitable driving mode comprising:

a longitudinal speed of the vehicle;

a rotational speed or rotational acceleration of at least a wheel of the vehicle;

a difference between rotational speeds or rotational accelerations of at least two wheels of the vehicle (in a possible embodiment of the invention, the just cited two wheels may belong to a front axle or to a rear axle of the vehicle);

a steering angle of (at least) a wheel of the vehicle;

a steering angle command input imparted by a user of the vehicle (this steering angle may be coincident or a fraction of the steering angle of the wheel, e.g., depending on the reduction ratio of the steering rack of the vehicle);

a static or a dynamic toe angle of at least a wheel of the vehicle;

a static or a dynamic camber angle of at least a wheel of the vehicle;

a static or a dynamic caster angle of at least a wheel of the vehicle;

a static or a dynamic Ackermann angle of at least a wheel of the vehicle (in an embodiment of the present invention, the just cited static or dynamic Ackermann angle is typically estimated at a steering wheel of the vehicle);

a pressure and/or a temperature of a tire mounted on a wheel of the vehicle;

an operating index of at least a suspension linked to a wheel of the vehicle (for the sake of the present invention, with the expression "operating index" it is to be meant a value of elastic load or preload of said suspension and/or a value of hydraulic/viscous resistance in compression or rebound direction of travel of the same suspension);

a ride height of the vehicle with respect to the ground (such ride height can be defined as an average ride height of the vehicle chassis with respect to the ground);

an output power and/or an output torque and/or a number of revolutions per minute of at least an engine and/or an electric motor and/or a powertrain of the vehicle;

a real-time front height and/or a real-time rear height;

a real-time travelling speed of the vehicle;

a longitudinal acceleration or deceleration of the vehicle in a travelling direction and/or along the longitudinal axis ($2a$);

a steering angle output resulting at front wheels of said vehicle;

a steering angle input resulting at a steering command of said vehicle;

a temperature of a vehicle component (such a vehicle component temperature may exemplificatively be a battery pack temperature and/or an inverter temperature and/or a motor temperature and/or a service fluid temperature and/or a gearbox temperature of the vehicle);

a rotational speed of the vehicle around a pitch axis;

a rotational acceleration of the vehicle around the just cited pitch axis;

a (typically, but not limitedly to) linear variation ratio, over time, of the front height ($2b$) and/or of the rear height ($2c$) along a pitching direction substantially perpendicular with respect to the travelling ground on which the vehicle is running;

a longitudinal acceleration of the front height ($2b$) and/or of the rear height ($2c$) along the just cited pitching direction; and an input command given by a user of the vehicle to the driving input interface.

Focusing on the driving input interface, it can be seen that for the fulfilment of the technical aims of the invention this hardware component of the vehicle may comprise at least one or more of the following parts:

a steering command;

at least an accelerator pedal and/or a brake pedal;

a gearbox selector;

a driving mode selector;

a ride height selector;

a suspension setting selector; and an aerodynamic status or mode selector;

a power level selector and/or a torque level selector; and a regenerative and/or hybrid powertrain mode selector.

According to the invention, the driving input interface may also comprise suitable controls dedicated to other "non-vital" systems of the vehicle (such as the radio/media apparatus or the ventilation/conditioning circuit for the vehicle passenger bay): in this case, and according to the potential impact of these non-vital systems on the safety of the vehicle and/or on the availability of the full performance spectrum of the vehicle, the management and control system according to the invention may also act autonomously on the non-vital systems themselves, e.g., by reducing the amount of music generated in the vehicle's cabin (in order to increase the user/driver's attention or in order to minimize energy drain from the battery pack) or by enhancing the function of battery pack cooling/conditioning or, as a further example, by maximizing the brake cooling capability by suitable diversion of airflow towards the braking apparati.

According to a further aspect of the invention, the management and control system are also adapted to determine and/or selectively prioritize, as a function of one or more of the hereabove presented dynamic parameters, at least the following further vehicle stati/modes:

a maximum longitudinal stability status/mode wherein vehicle variations of spatial configuration around its yaw and/or pitch axis are minimized or nullified;

a maximum lateral stability status/mode wherein vehicle variations of spatial configuration around its roll axis are minimized or nullified;

a minimum understeer status/mode wherein vehicle mechanical grip and/or aerodynamic downforce enhanced grip at its front end are maximized;

a minimum oversteer status/mode wherein vehicle mechanical grip and/or aerodynamic downforce enhanced grip at its rear end are maximized;

a minimum ride height status/mode wherein one or more of the vehicle ride heights, with respect to said number of points of the underbody, are maintained at a minimum value; and a maximum ride height status/mode wherein one or more of the vehicle ride heights, with respect to said number of points of the underbody, are maintained at a maximum value.

Otherwise stated, the present invention can provide for an even deeper integration (both from the hardware standpoint and from the software/firmware standpoint) between traditional stability control means (ABS, TCS, torque vectoring systems, ESC and so on) and the management and control system, in order to gain a substantial reduction in reaction time for such stability control means to intervene and to provide for a smoother and more efficient intervention as well.

Switching now to hardware components, it must be observed that the onboard systems typically can comprise at least one or more of the following features:

a front end height and/or a rear end height controller (which may be for example electrically motorized or hydraulically/pneumatically powered, and which are adapted to set at least at a front height and/or a rear height of the vehicle with respect to a travelling ground in a condition of travel at a given constant speed of the chassis);

a suspension system, which conveniently may be an "active type" suspension system adapted to define a vehicle setup (and such setup may typically comprise one or more preload values of spring elements associated with each wheel and one or more hydraulic or viscous damping forces acting on each wheel, and in case it may also comprise one or more defining parameters for any suspension component like, for example, sway bars or anti-roll bars);

a steering system adapted to define a steering direction of at least one wheel (and typically, of at least one steering axle in a so-called "2WS" vehicle or even of at least two steering axles in a so-called "4WS" vehicle);

an engine and/or powertrain management system adapted to define at least a revving range and/or a torque and/or power and/or regenerative capability of said engine and/or powertrain (or more in general, any other parameter associated with the power/torque output of such an engine and/or powertrain management system); and an aerodynamic force generator, which is conveniently adapted to define a lift and drag force distribution on the vehicle.

Looking more closely at the just cited aerodynamic force generator, a possible embodiment of the invention may comprise at least one or more of the following features:

a so-called "front aero assembly" associated to and active in proximity and/or in correspondence of a front end of the vehicle and adapted to generate a front aerodynamic force;

a so-called "rear aero assembly" associated to and active in proximity and/or in correspondence of a rear end of the vehicle and adapted to generate a rear aerodynamic force; and at least one, and preferably two so-called "side aero assemblies" associated to and active in proximity and/or in correspondence of at least one side, and preferably to each side of the vehicle and respectively adapted to generate side aerodynamic forces (such side aerodynamic forces can be generated independently for each side of the vehicle, for example, if an extra amount of downforce is required to be applied just onto the wheels of one side of the vehicle, e.g., during a high speed drifting maneuver or during a prolonged long "sweeper" corner wherein a lateral balancing of the vehicle is required).

In order to give the driving modes prioritization system the most complete and accurate capability of detection (which is crucial for the right assessment of the ideal driving mode preference), the management and control system comprise:

sensor means adapted to measure one or more of the previously cited dynamic parameters;

an elaborating unit adapted to receive as an input the dynamic parameters and capable of calculating and emitting a command output towards at least one, and preferably to all onboard systems; and actuator means operatively acting on at least one, and preferably on all the onboard systems and being adapted to receive the just cited command output.

The "command output" as hereabove expressed is intended to be, according to the invention, as a "single" output directed towards a correspondingly single onboard system or as a group of outputs directed simultaneously (or sequentially) to different onboard systems, and the number of parameters ideally contained in each command output can be varying from just one to a given number, depending on the overall number of parameters that can be received by each onboard systems receiving the command output itself.

The just cited actuators, and by extension of the main functional concept of the invention, also the management and control system can conveniently be adapted to reversibly configure at least one, and preferably all the onboard systems; such a reversible configuration may occur (at least) between a first condition, which is related to a first set of system-specific command parameters, and a second condition which is related to a second set of system-specific command parameters (of course, the second set of system-specific command parameters is different from the first set of system-specific command parameters).

Advantageously, the just introduced reversibility of the order of preference/priority given to the various driving modes available to the user/driver can be used in order to give the vehicle the capability of returning spontaneously to the driving mode set out voluntarily by the user/driver as soon as the conditions which have determined its abandonment (e.g., in favor of a safer driving mode) have ceased to exist: for example, the vehicle may return to its user-defined "high speed mode" as soon as a sudden transverse gust of wind has ceased to exert its effects (in this case, the driving modes prioritization system, having detected the wind gust, may have autonomously set a "maximum stability" driving mode notwithstanding the user/driver defined setting, which is definitely not advisable in terms of risking a high-speed loss of control of the vehicle).

According to another aspect of the invention and delving once again deeper into details, the management and control system are capable of calculating and emitting a command output comprising (in an exemplificative yet not limiting way) at least one or more of the following command parameters:

an adjustment angle;

a displacement and/or translation and/or a rotation;

a geometric and/or spatial configuration;

a value of resistance force;

a value of aiding force;

a value of energy consumption and/or absorption; and a value of energy release and/or output and/or vehicle travelling speed.

Conveniently, at least one and preferably all of the just cited command parameters are associable to said onboard systems.

It should also be realized that the present disclosure provides for a, a non-transitory computer readable storage medium, which stores instructions that when executed by one or more processors, cause the one or more processors to perform the various functionalities described herein, related to control of a vehicle. For example, the one or more processors can:

control a vehicle, wherein the vehicle comprises a chassis supporting wheels, at least one of the wheels being a driving wheel and at least one of the wheels being a maneuvering wheel, at least one engine or powertrain supported by the chassis and linked to the driving wheel and/or to a driving axle, a plurality of onboard systems dedicated to motion control of the vehicle and/or to determine or affect dynamic parameters of the vehicle during its movement, and a driving input interface interfaceable with a user of the vehicle or with an autonomous guidance system;

determine aggregated command outputs, each of the aggregated command outputs comprising a set of command parameters that control the plurality of onboard systems, the driving input interface, the at least one engine or powertrain, wheels, and chassis, wherein each set of command parameters corresponds to a driving mode, including user-selected driving mode and a plurality of safety driving modes;

detect one or more dynamic parameters including: a current vehicle movement, overall status, and/or condition;

selectively prioritize each of the aggregated command outputs based on one or more of the dynamic parameters exceeding a threshold safety value, the vehicle command parameters being changed according to the prioritization of the aggregated command outputs to change from a user-selected driving mode to one of the plurality of safety driving modes; and change, in response to the one or more of the dynamic parameters no longer exceeding the threshold safety value, the vehicle command parameters from the prioritized safety driving mode to the user-selected driving mode.

Figure 3:
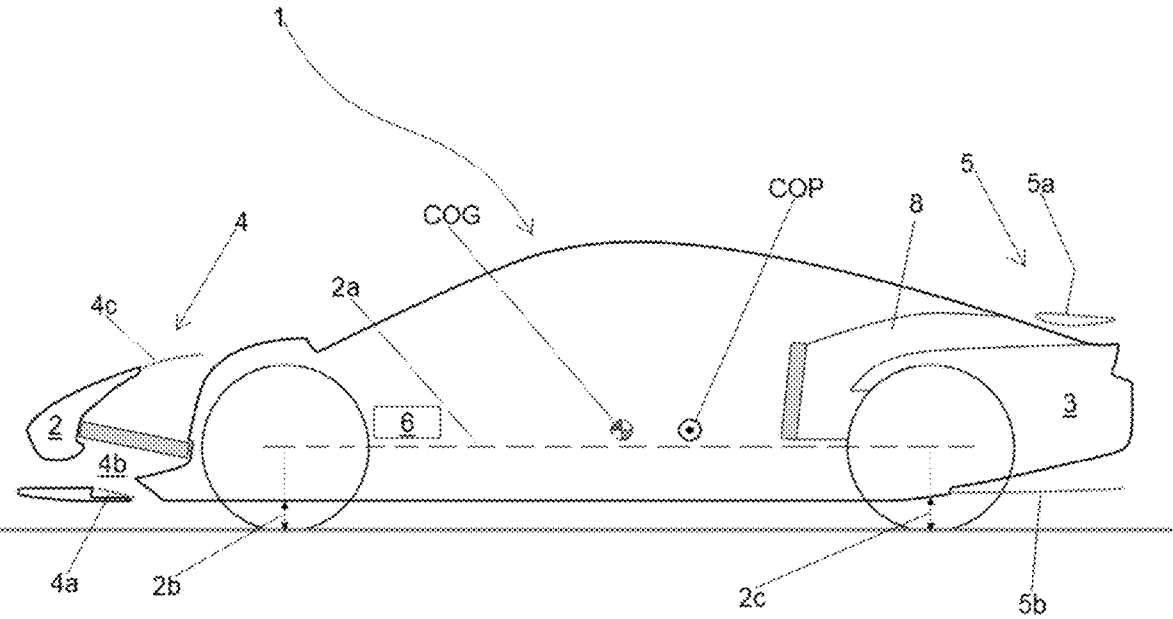
FIG. 3 and FIG. 4 are schematic longitudinal views of a vehicle encompassing a possible embodiment of the active aerodynamics system according to the invention, wherein its structural sub-components are shown in two exemplificative (yet not limitative) different possible positions/locations/configurations.

As discussed above, the vehicles "onboard systems" can include active aerodynamics located in various body parts of the vehicle. FIG. 3 illustrates one such example of a vehicle active aerodynamics system according to the present disclosure. The exemplary vehicle (1) includes a front end (2) and a rear end (3): conveniently, the rear end (3) is located opposite to the front end (2) along a longitudinal axis (2a)

of vehicle's development: each of the front end (2) and rear end (3) are respectively located at a front height (2b) and at a rear height (2c) with respect to a travelling ground in a condition of travel at a given constant speed of said chassis (and such heights, or "ride heights" in common automotive jargon) may be regarded as "nominal" and essentially deriving from various conditions relating to the vehicle setup and driving conditions (longitudinal travel speed, uniformity of the travelling surface, presence of one or more occupants and/or payload and so on).

According to embodiments of the present disclosure, the control system (100) can serve as, or communicate with an independent, active aerodynamics system (6) according to the present disclosure can comprise a front aero assembly (4), which is associated to and is actually "active" in proximity and/or in correspondence of the front end (2) (e.g., in order to generate a so-called "front aerodynamic force") and a rear aero assembly (5) associated to and active in proximity and/or in correspondence of the rear end (3) (in order to generate a corresponding "rear aerodynamic force"). Advantageously, the system according to the present disclosure can further comprises management and control system (6) which are active on the front aero assembly (4) and/or on the rear aero assembly (5) so as to contain and/or limit, under transient conditions—which for example may imply that the vehicle (1) is undergoing a longitudinal and/or lateral acceleration or deceleration, occurring from said condition of travel at a given constant speed, variations of said front height (2b) and/or said rear height (2c) to be respectively greater or equal to a front end threshold height and a rear end threshold height.

An active aerodynamics system according to the present disclosure can achieve a peculiar control logic, whereby the determination of the downforce, and its distribution over the two axles of the vehicle (1) is not simply linked to the sheer linear speed of the vehicle, but it is connected in a "feedback loop" with a geometric riding/driving parameter (the ride height or heights) which has a strong influence on the vehicle dynamic mass distribution and therefore which has a large influence on the behavior of the vehicle in transient conditions: therefore, the intervention of the present disclosure's system affects the vehicle dynamics in a way which is simply not provided for (not even foresighted) by known art's systems.

It is also to be noted that an active aerodynamics system can be arranged to address one-directional acceleration (e.g. positive or negative variation of travelling speed along the longitudinal axis (2a)), but it may also be structurally and functionally implemented in order to manage variation of ride heights occurring to the insurgence of acceleration along and/or around other axes of the vehicle (1) (and namely, around or along the yaw axis or the roll axis, since these transient conditions may result in a variation of ride heights not just limited in difference from the front to the back but also from one side to the other side of the vehicle itself): for example, an active aerodynamics system according to the present disclosure may also manage/control transient situations related to lateral acceleration/stability, as during cornering, e.g. in order to move the so-called "COP" (Center of pressure) more towards the front axle in order to improve the cornering radius of the vehicle (1).

The aforementioned management and control system (6) can comprise a suitable sensor adapted to measure one or more dynamic parameters related to the variations of the front height (2b) and/or of the rear height (2c) (and/or, conveniently, to the "transient conditions" exemplified hereabove), an elaborating unit adapted to receive as an input the just cited dynamic parameters and capable of calculating and emitting a command output towards the front aero assembly (4) and/or to the rear aero assembly (5) and actuator operatively acting on the front aero assembly (4) and/or on the rear aero assembly (5) and adapted to receive said command output: according to the present disclosure, the management and control system (6) can therefore adapted to limit or nullify rotations of the vehicle (1) around a pitching axis (2d) perpendicular to said longitudinal axis (2a) and substantially parallel to a ground whereupon said vehicle (1) is travelling.

Figure 4:
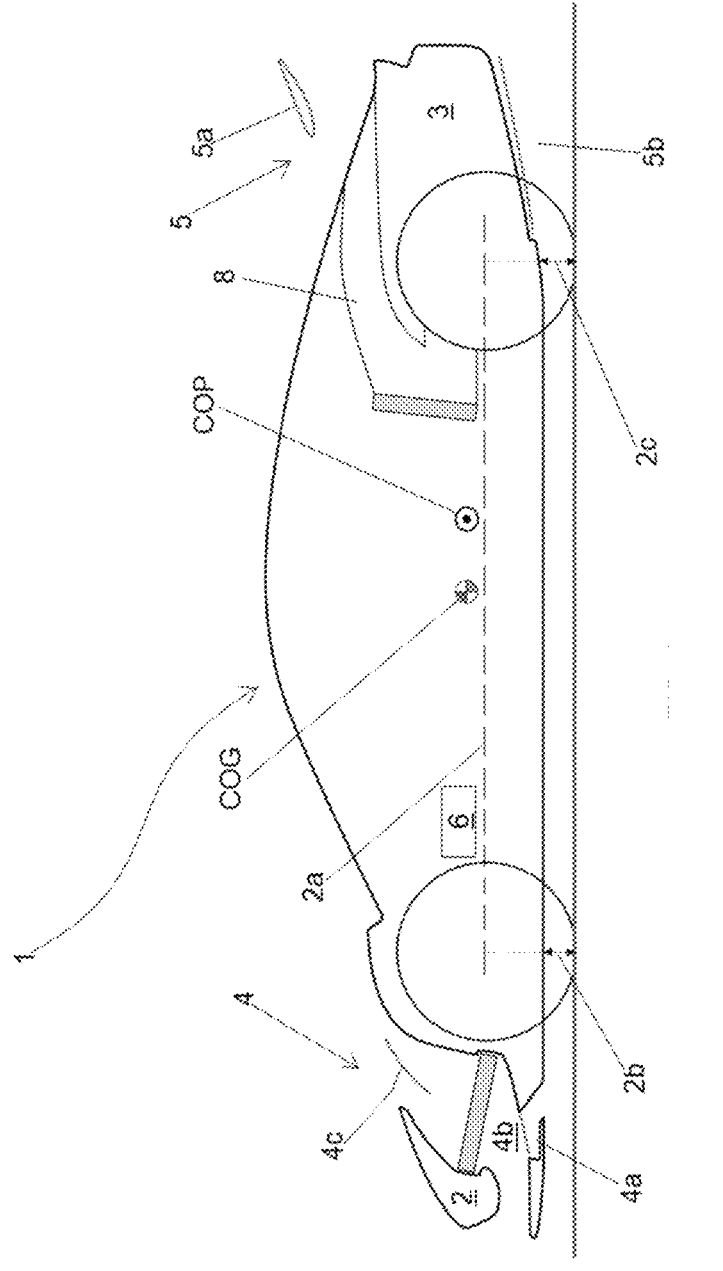

With reference to FIG. 3 and FIG. 4, it can be seen that the front aero assembly (4) may comprise a movable flap (4a), which may be located in proximity and/or in correspondence of the front end (2) (e.g., located on a front portion of an underbody of the vehicle (1)): in order to perform its most suitable functions, such a flap (4a) is reversibly configurable at least between:

a first angular position, in which it generates a first amount of front downforce applied to the front end (2) by diverting an airflow in an upward and rearward direction relating to a direction of travel of the vehicle (1); and a second angular position rotatably displaced with respect to said first angular position, in which it generates a second amount of downforce lesser than the just cited first amount of front downforce by diverting said airflow in a downward and rearward direction relating to said direction of travel of the vehicle (1).

The diverting capabilities of the flap (4a) can be, if required, integrated with other structures and functionalities of the vehicle (1): for example, the flap (4a) can be operated so as to manage an airflow upward and towards the vehicle's radiators thereby maximizing or minimizing the airflow rate directed to the radiators themselves: in this way, beside the variation of the front downforce, also a variation of cooling effect can be selectively determined or chosen.

According to the present disclosure, the front aero assembly (4) may further comprise a front aerodynamic active element located in proximity and/or in correspondence of the front end (2): such front aerodynamic active element (which is not represented in FIGS. 3-6, but which can be realized in any suitable form by a skilled technician operating in the sector of pertinence of the present invention, e.g. a wing-shaped element or a so-called active front splitter and so on) may be located on a front portion of an underbody of the vehicle (1) so as to be reversibly configurable at least between:

a first pitch angle and/or height with respect to the longitudinal axis (2a), in which it generates a first amount of front downforce applied to the front end (2) by generating a first aerodynamic force directed downwards with respect to the vehicle (1); and a second pitch angle and/or height with respect to the longitudinal axis (2a) displaced with respect to the first pitch angle and/or height, in which it generates a second aerodynamic force lesser than and/or upwards directed with respect to said first aerodynamic force.

The flap (4a) and the front aerodynamic active element just described may be working in coordination with each other, or they may also be present as independent (or "standalone") devices in the front aero assembly (4), depending on the operative requirements and/or on the overall need of maximum or minimum front downforce set as a design parameter for the vehicle (1).

Figure 5:
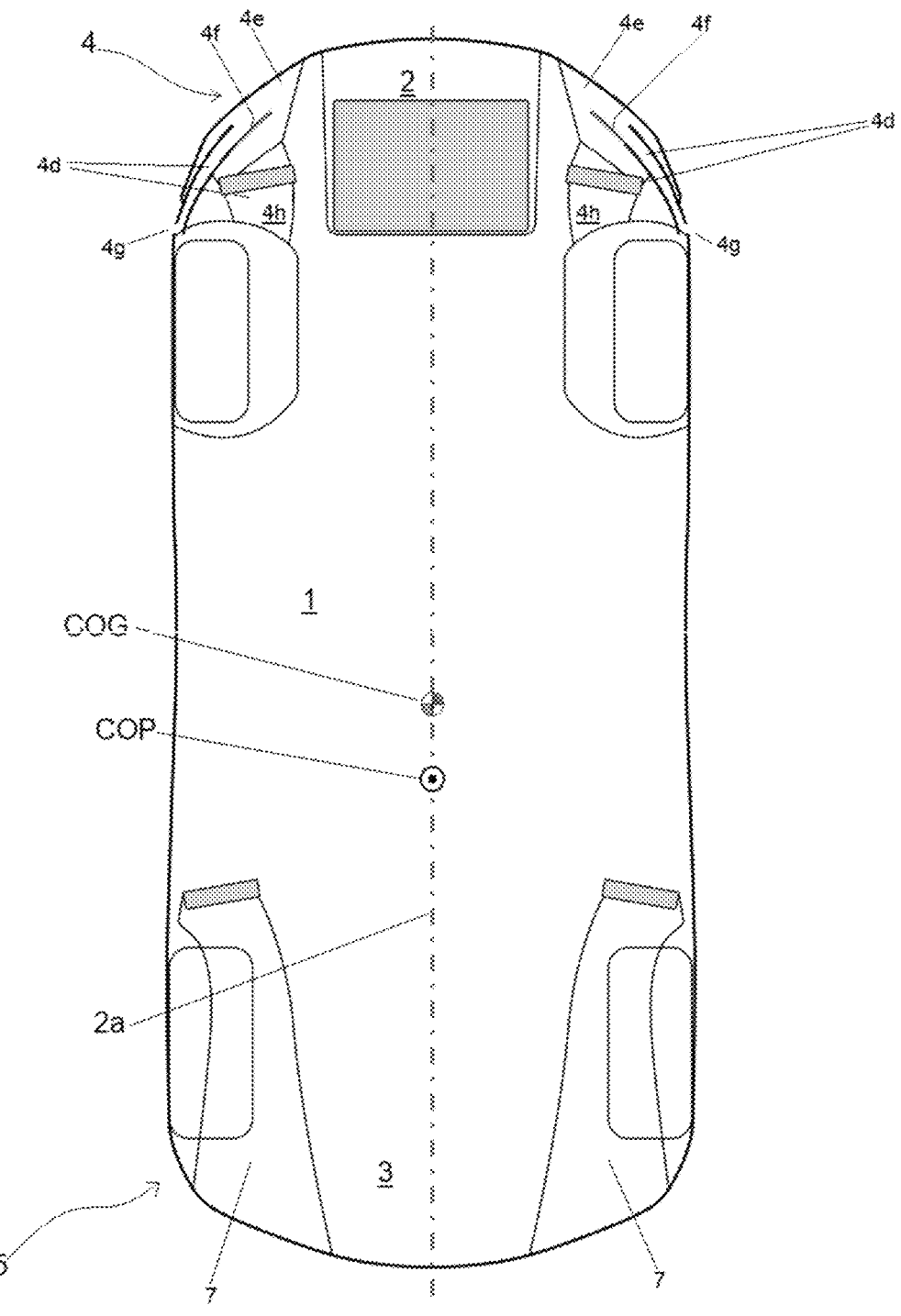
FIG. 5 and FIG. 6 are schematic views from above of the vehicle in FIG. 3 showing further possible sub-components of the active aerodynamics system according to the invention (such further possible sub-components being represented in two exemplificative, yet not limitative, different possible positions/locations/configurations).
Figure 6:
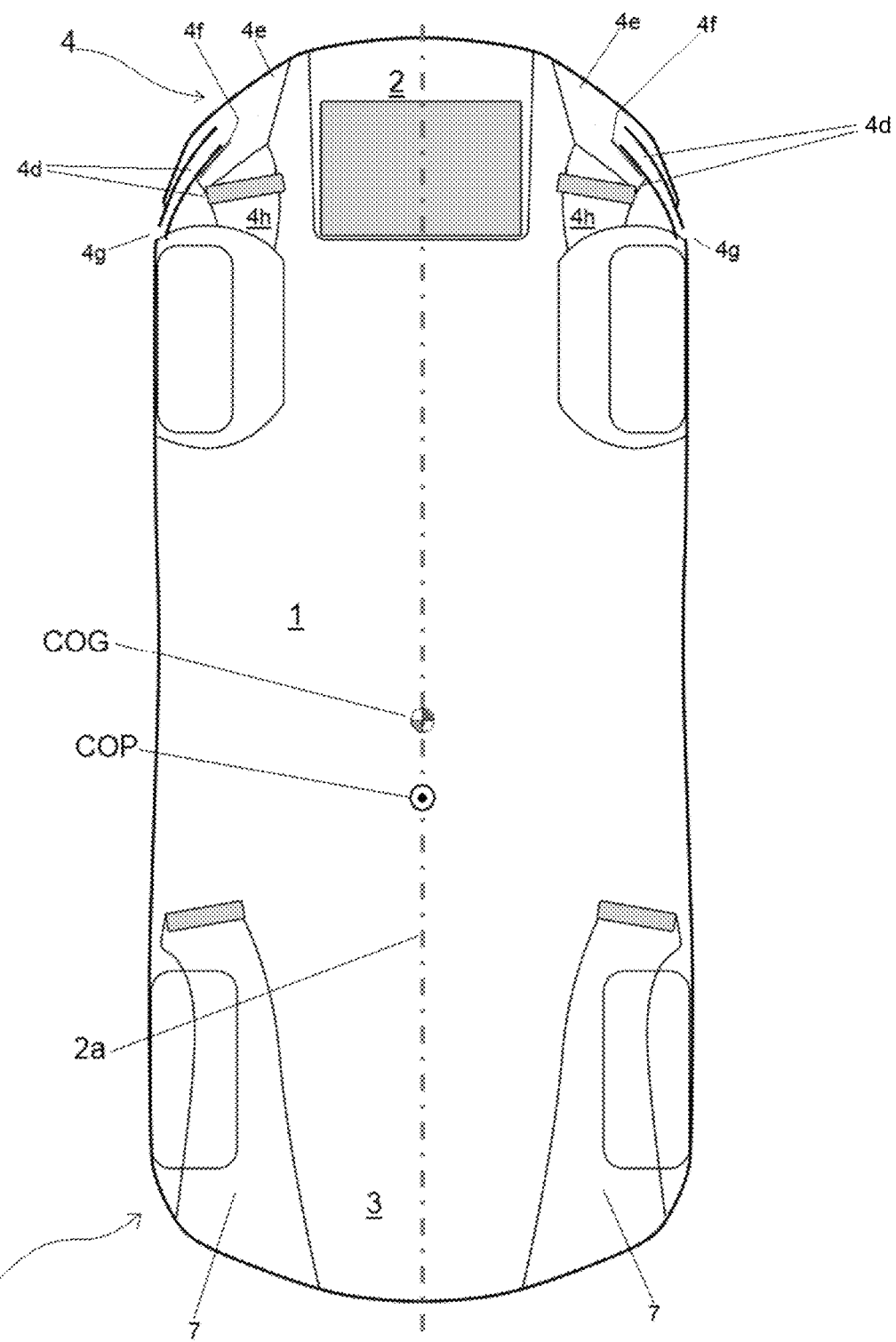

The front aero assembly (4) may further comprise a channeling duct (4b) having an inlet (e.g. located in the front end (2) of the vehicle (1), as per FIG. 5 and FIG. 6) and an outlet (e.g. located in an upper portion of the vehicle (1), as per FIG. 3 and FIG. 4) downstream with respect to the inlet: in this possible embodiment, the movable flap (4a) and/or the front aerodynamic active element being active in said channeling duct (4b).

As a further possible structural option in the present invention, the front aero assembly (4) may comprise a splitter (4c) aerodynamically active in proximity and/or in correspondence of the channeling duct (4b) itself (e.g. this splitter can be located in the area corresponding to the so-called "bonnet" of the vehicle, and it can also be regarded as a so-called "flap" in the technical jargon of the present invention), so as to be reversibly configurable at least between:

a first discharging configuration (shown in FIG. 5), in which it determines a first outlet cross-section of the channeling duct (4b) (and because of this, the just cited first cross-section determines a first average airspeed and a first air mass flow rate of an airflow exiting from said channeling duct (4b)); and a second discharging configuration (shown in FIG. 6), in which it determines a second outlet cross-section of the channeling duct (4b) (which consequently determines a second cross-section of the channeling duct (4b) greater than the first cross-section of the channeling duct (4b), determining also a second average airspeed and a second average air mass flow rate respectively greater than the first average airspeed and greater than the first air mass flow rate.

It is to be observed that the just cited splitter (4c) also affects (front) downforce by a significant margin, and more in detail, by reversibly shifting between its first discharging configuration and its second discharging configuration it determines a minimum/maximum variation of net total (front) air flow rate which trades off between maximum top speed of the vehicle (1) and range/efficiency of the vehicle (1) itself.

Conveniently, the front aero assembly (4) may further comprise at least one (and, for example, two) variable-configuration side channeling duct(s) (4d) which are aerodynamically active on at least one, and typically on two mutually opposite lateral portions of the front end of the vehicle (1).

From a structural standpoint, a channeling duct (4d) comprises a side inlet (4e), a first side outlet (4g) (located downstream to the side inlet (4e) and located in proximity and/or in correspondence of an external side of the vehicle (1)), a second side outlet (4h) (located downstream to said side inlet (4e) and facing into a wheel arch in which a front wheel of the vehicle (1) is located) and at least a movable vane (40 located between the side inlet (4e) and the first and/or side outlet (4g; 4h): from a functional standpoint, such movable vane (40 is reversibly configurable at least between a first diverting configuration, wherein an airflow passing through said variable-configuration side channeling duct (4d) is discharged towards the external side of the vehicle (1), and a second diverting configuration wherein said airflow passing through said variable-configuration side channeling duct (4d) is discharged into the wheel arch (and optionally, in such a second position radiator air mass flow would increase and air will exit to the wheel arch).

Focusing now the attention on the rear aero assembly (5) and looking at the annexed FIG. 3 and FIG. 4, it can be observed that this structural sub-group of elements pertaining to the invention may comprise a rear wing-shaped element (5a) located in proximity and/or in correspondence of the rear end (3) (e.g., it can be located on a rear upper portion of the vehicle (1)): conveniently, the just cited rear wing-shaped element (5*a*) may be reversibly configurable at least between:

a first condition (shown in FIG. 3), in which it generates a first amount of rear upper downforce and a first amount of rear "upper" aerodynamic drag applied to the rear end (3); and a second condition (shown in FIG. 4) displaced with respect to the first condition, in which it generates a second amount of rear upper downforce greater than said first amount of rear upper downforce and/or in which it generates a second amount of rear "upper" aerodynamic drag greater than the first amount of rear "upper" aerodynamic drag.

According to the present disclosure, it can be observed that the term "upper" rear downforce is referred to aerodynamic effects generated by structural elements which essentially act on the top portion of the vehicle tail or boot or terminal bodywork; at the same time, it can also to be observed that the rear wing-shaped element (5*a*) is also dealing, throughout its varying conditions, with a variation of side effects such as influencing rear diffuser (5*b*) effectiveness and/or possible airflow towards and/or from any rear radiators fitted in the vehicle (1).

Therefore, the rear wing-shaped element (5*a*) also determines a trade-off between the maximum theoretical top speed of the vehicle (1) and its range and/or energetic efficiency (both intended from the thermal and from the aerodynamic standpoint), as already explained regarding some structural components of the front aero assembly (4).

In a possible synergistic coordination with the rear wing-shaped element (5*a*), the rear aero assembly (5) may further comprise a rear diffuser (5*b*) located in proximity and/or in correspondence of the rear end (3) (e.g., located on a rear lower or underbody portion of the vehicle (1)) so as to be reversibly configurable at least between:

a first position, in which it generates a first amount of rear "lower" downforce and a first amount of rear "lower" aerodynamic drag applied to the rear end (3); and a second position displaced with respect to said first condition, in which it generates a second amount of rear "lower" downforce greater than the just cited first amount of rear lower downforce and/or in which it generates a second amount of rear lower aerodynamic drag greater than the first amount of rear lower aerodynamic drag.

According to the present disclosure, it can be observed that the term "lower" rear downforce is referred to aerodynamic effects generated by structural elements which essentially act on the bottom (or "closer to the travelling ground") portion of the vehicle tail or boot or terminal bodywork, given that the upper and lower rear downforce may act in mutual combination and may be selectively determined according to the various operative requirements of the vehicle (1) and/or of the active aerodynamics system.

According to the present disclosure, the two "separate" (that is, upper and lower) contributions to the overall rear downforce coming from the rear wing and from the movable underbody can be considered as cooperatively determining an overall rear downforce: otherwise stated, the lower and upper rear downforce define a total rear downforce value and/or distribution which is suitably managed by the present invention.

According to the present disclosure, the management and control system (6) can be adapted to measure and elaborate (and therefore, are adapted to use as operating input conditions for determining the selective variation of configuration of its related structural components/elements) one or more of the following dynamic parameters:

a real-time front height (2*b*) and/or a real-time rear height (2*c*);

a real-time travelling speed of the vehicle (1);

a linear acceleration or deceleration of the vehicle (1) in a travelling direction and/or along the longitudinal axis (2*a*);

a steering angle output resulting at front wheels of the vehicle (1);

a steering angle input resulting at a steering command of the vehicle (1);

a temperature of powertrain component (e.g., such component may be a battery pack, an inverter, a motor, a gearbox or a radiator and such a temperature may be a temperature of a coolant flowing inside such powertrain component);

a rotational speed of the vehicle (1) around a pitch axis;

a rotational acceleration of the vehicle (1) around said pitch axis;

a linear variation ratio, over time, of the front height (2*b*) and/or of the rear height (2*c*) along a pitching direction substantially perpendicular with respect to said travelling ground; and(/or)

a linear acceleration of the front height (2*b*) and/or of the rear height (2*c*) along said pitching direction.

By exploiting one or more of the hereabove depicted parameters/inputs, the management and control system (6) can be conveniently capable of calculating and emitting a command output, which in turn may comprise at least one or more of the following command parameters:

an adjustment angle of the movable flap (4*a*);

an actuation speed of the movable flap (4*a*);

an adjustment angle of the front aerodynamic active element;

an actuation speed of the front aerodynamic active element;

an adjustment angle of the splitter (4*c*);

an actuation speed of the splitter (4*c*);

an adjustment angle and/or position and/or an actuation speed of said at least a movable vane (4*f*);

an adjustment angle of the rear wing-shaped element (5*a*);

an adjustment height of the rear wing-shaped element (5*a*)

an actuation speed of the rear wing-shaped element (5*a*);

an adjustment angle of the rear diffuser (5*b*); and an actuation speed of the rear diffuser (5*b*).

According to a possible and optional embodiment of the present disclosure, the channeling duct (4*d*) (which in the annexed figures is represented as a fixed-geometry feature) may be implemented as a variable-geometry conduit: in this embodiment, the management and control system (6) may also be conveniently capable of calculating and emitting a command output which may also comprise command parameters that are related to any kind of possible geometry modification of the channeling duct (4*d*) itself.

Otherwise stated, the entire vehicle front and/or rear and/or right-left side aerodynamic loads can be selectively varied according to the "intervention/feedback logic" of the invention (e.g., in order to keep ride heights in various points of the vehicle underbody to be kept above pre-determined threshold values).

In an even further possible embodiment of the present disclosure, at least one, and typically two side aero assemblies (respectively associated to and active in proximity and/or in correspondence of at least one side, and typically to each sides of the vehicle (1), and therefore respectively adapted to generate side aerodynamic forces) may be present: such side aerodynamic forces may be independently generated for each side of the vehicle (1), and in view of obtaining such a freedom of intervention/determination/generation the management and control system (6) is also active on said side aero assembly or assemblies so as to contain and/or limit, under transient conditions comprising at least a rotational acceleration and/or deceleration of said vehicle (1) around a roll axis and/or around a yaw axis, variations of at least one side height and preferably each side heights to be respectively greater or equal to a side or sides threshold height (or heights).

According to the present disclosure, the linear and/or angular positions of each structural element belonging to the present active aerodynamic system, and their variation/combination in height and/or position and/or angle can be independently and fully adjustable.

According to various possible structural embodiments of the just cited "front+rear+one or two side" aero assemblies' layout, at least one side aero assembly may typically comprise:

one or more side movable flaps;
  one or more side active aerodynamic elements;
  one or more side wing-shaped elements;
  one or more side channeling ducts; and
  one or more side splitters (e.g., active in proximity and/or in correspondence of the just cited side channeling ducts); and/or
  one or more side diffusers, And more generally such implementing options may conveniently be linked to the additional presence, in the management and control system (6) of:

a sensor adapted to measure one or more lateral dynamic parameters related to said variations of the side front height or heights and/or to the so-called transient conditions;
  a sensor adapted to measure one or more thermal parameters related to a working condition of at least one vehicle radiator or heat sink (or any other powertrain component/coolant, if required) and/or to measure thermal parameters related to an overheating condition of the vehicle (e.g., these sensors are related to a function of opening suitable "vents" in the vehicle in occurrence of said overheating condition);
  an elaborating unit adapted to receive as an input said lateral dynamic parameters and capable of calculating and emitting a lateral command output towards one (or more) side aero assembly (or assemblies); and
  an actuator operatively acting on the side aero assembly (or assemblies) and adapted to receive the just cited lateral command output.

From a functional standpoint, it can be seen that the present invention's management and control system (6) is capable of longitudinally shifting a position of the so-called "center of pressure" (COP) (which location is related to aerodynamic forces exerted on the vehicle (1)): the center of pressure (COP) may for example be shifting (at least) along the longitudinal axis (2a) and, by appropriate set-up and/or re-configuration of the active aerodynamics system, be reversibly configurable at least between:

a first longitudinal position, in which it is placed upstream or in front of a center of gravity (COG) of the vehicle (1), with respect to a travelling direction of the vehicle (1) itself, and
  a second longitudinal position in which it is placed downstream or behind with respect to the center of gravity (COG) of the vehicle (1), with respect to a travelling direction of the vehicle (1) itself.

According to the present disclosure, the just cited "shifting" of the center of pressure (COP) is determined (at least) as a function of the fact that the front height (2b) and/or the rear height (2c) is and/or are respectively greater or equal to a front end threshold height and a rear end threshold height.

Still it is to be observed that the downforce effects which are obtainable by the active aerodynamics system according to the invention may be relatively smaller (in their value or "moduli") compared to inertial loads, but notwithstanding this difference in net value they can be still capable to exert a significant contribution in reducing the so-called "vehicle dive", which in turn affects the air flow passing through underbody (and therefore helps in the generation of rear downforce): in this way, it can be seen that the present invention also devises an overall "control logic" to be applied onto a high performance vehicle wherein the aerodynamic effects are used to control the vehicle's orientation in space, and this orientation in space is directed also to maintain an overall vehicle condition in which the aerodynamic loads can be still kept at their optimal values (and therefore their beneficial effect in vehicle stabilization can be exploited over a longer period of time.

Coming back to the movements of the Center Of Pressure (COP), it can be observed that the second longitudinal position of the center of pressure (COP) may be occurring in correspondence of a longitudinal deceleration (e.g., in correspondence to a braking transient) of the vehicle (1) along its axis (2a): typically, when the center of pressure (COP) is shifted in its second longitudinal position behind the center of gravity (COG) in a transient time, the just cited transient time can be estimated at less than 1 second (this advantageously allows to enhance the rear downforce, countering the effects of inertia and giving the rear vehicle brakes a better working condition thanks to the reduction of the weight shift towards the front axle).

According to a further aspect of the present disclosure, the management and control system (6) may also be capable of laterally shifting a position of said center of pressure (COP) at least sideways with respect to the longitudinal axis (2a): otherwise stated, the center of pressure (COP) may reversibly be configurable at least between a first lateral position (in which it is placed upstream or downstream of the center of gravity (COG) in a first laterally shifted position with respect to the longitudinal axis (2a)) and a second lateral position (in which it is placed upstream or downstream of the center of gravity (COG) in a second laterally shifted position with respect to the longitudinal axis (2a)).

The just cited second laterally shifted position is, in the example hereabove introduced, substantially opposed to the first laterally shifted position with respect to the longitudinal axis (2a), and as a consequence of this a lateral shifting of the center of pressure (COP) is conveniently determined at least as a function of the front height (2b) and/or of the rear height (2c) and/or the (at least one) side height and/or said each side heights: one or more of these ride heights will be managed and controlled so as to be respectively greater or equal to a front end threshold height and a rear end threshold height (and once again, the active aerodynamic system according to the disclosure is employed to achieve a ride height balancing throughout various points in the vehicle underbody).

In summary, the present disclosure can include a system that is capable of enhancing the vehicle dynamics under extreme transients: actually, the ride height(s) control achieved through aerodynamic elements can be efficiently controlled even during the most demanding driving situations, for example during hard braking from high speeds: in these situations, the contribution of the active aerodynamic system in terms of preventing the vehicle from the so-called "bottom-downs" (that is, whenever the ride height and/or the vertical travel of the front or of the rear suspension is reduced to a point wherein the suspension is actually non-functional) greatly helps in maintaining the vehicle itself drivable, maximizing the mechanical grip at the wheels and therefore maintaining a high level of braking capability along with a high level of directionality.

Beside this, it is to be remarked that the overall structural architecture of the aerodynamics system can be simply and quickly integrated within the vehicle chassis and/or body, and its actuation sub-systems can be efficiently governed by the onboard electronics' suite: this leads also to a high integration grade of the system itself with the overall vehicle management electronics' suite and allows for an even deeper and "richer" interactions in terms of determining the driving dynamics and/or various vehicle configurations which may lead to different results in terms of responsiveness to the driver's inputs.

Furthermore, an aerodynamic system according to the present disclosure can also be configured (even temporarily, e.g., when very peculiar conditions arise independently from the transient driving conditions in which the vehicle itself is currently being involved) in order to help some auxiliary functions as cooling of the engine and/or the battery pack and/or the braking system.

An aerodynamic system as described in the present disclosure can be implemented in any other embodiment described in the present disclosure, and also by way of collateral modifications available to a skilled technician in the technical sector of pertinence of the invention itself, and thus maintaining the functional achievements of the invention along with practicality of production, usage, assembly and maintenance.

The described and claimed invention achieves the aforementioned technical aims and surpasses the shortcomings of the prior art hereabove mentioned, starting but not being limited to the advantage consisting in a very high degree of "zero-time" adjustment of the overall configuration of the vehicle as a function of any anomaly or any potential harm deriving from the environment or from the driver's input: such adjustment is not only involving the intervention of safety controls but can be even predictive, re-setting a more suitable driving mode in a completely autonomous way and therefore bringing one or more onboard vehicle systems into a working condition wherein they can prevent or deal more efficiently with the anomaly itself.

Besides, the overall structural architecture of the herein described and claimed system allows for a high level of reliability and compatibility in the data/inputs/outputs exchange throughout the vehicle's inboard network, giving rise to an inherent level of implementability with respect to known-type hardware (like CAN-bus or the like).

Furthermore, the overall structure of the present invention can be implemented in various embodiments in order to cope with various ranges of torque outputs, maximum rotations per minute values and whatever else operating parameter which may characterize a vehicle with a single (electric or "ICE") motor or more than one of (electric and/or "ICE") motors, and giving a performance envelope of any kind ranging from "daily drivers" to "hypercars".

Last but not least, the driving mode prioritization system according to the present invention can also be implemented in any other embodiment enclosed in its inventive concept as claimed, also by way of collateral modifications available to a skilled technician in the technical sector of pertinence of the invention itself, and thus maintaining the functional achievements of the invention along with practicality of production, usage, assembly and maintenance.

The invention claimed is:

1. A vehicle comprising:
   a chassis supporting wheels, at least one of the wheels being a driving wheel and at least one of the wheels being a maneuvering wheel;
   one or more controllers configured to control:
      at least one engine or powertrain supported by the chassis and linked to the driving wheel and/or to a driving axle;
      a plurality of onboard systems dedicated to motion control of the vehicle and/or to determine or affect dynamic parameters of the vehicle during its movement, the plurality of onboard systems including an active aerodynamics system configured to alter an aerodynamic state of the vehicle during movement of the vehicle;
      a driving input interface interfaceable with a user of the vehicle or with an autonomous guidance system; and
      a management and control system, configured to:
         determine aggregated command outputs, each of the aggregated command outputs comprising a set of command parameters that control the plurality of onboard systems, the driving input interface, the at least one engine or powertrain, wheels, and chassis, wherein each set of command parameters corresponds to a driving mode, including a user-selected driving mode and a plurality of safety driving modes;
         detect one or more dynamic parameters including: a current vehicle movement, overall status, and/or condition;
         selectively prioritize each of the aggregated command outputs based on one or more of the dynamic parameters exceeding a threshold safety value, one or more vehicle command parameters of the set of command parameters being changed according to a prioritization of the aggregated command outputs to change from a user-selected driving mode to one of the plurality of safety driving modes, corresponding to a prioritized safety driving mode; and
         change, in response to the one or more of the dynamic parameters no longer exceeding the threshold safety value, the one or more vehicle command parameters from the prioritized safety driving mode to the user-selected driving mode;
      wherein when the vehicle is in the user-selected driving mode, the active aerodynamics system of the vehicle is in a first aerodynamic state;
      wherein when the vehicle is in the prioritized safety driving mode, the active aerodynamics system is in a second aerodynamic state, the second aerodynamic state differing from the first aerodynamic state.

2. The vehicle of claim 1, wherein the prioritization of the aggregated command outputs comprises one or more of the following vehicle stati/modes, provided in a decreasing priority value sequence:
   a failure status/mode, in which one or more the dynamic parameters exceed a respective safety threshold value, wherein the aggregated command outputs are configured to adjust the set of command parameters to bring the vehicle to a dynamic condition of at least one of maximum stability, minimum or zero acceleration, minimum or zero travelling speed, minimum or zero torque output, or minimum heat generation;

an airbrake status/mode, in which at least a vehicle speed is equal to or greater than a given threshold speed and/or wherein the vehicle is temporarily adapted to generate a higher aerodynamic drag and aerodynamic downforce, the aerodynamic drag being an overall aerodynamic drag or a front aerodynamic drag on a front axle of the vehicle or a rear aerodynamic drag on a rear axle of the vehicle, within a predetermined amount of time and with respect to a status/mode from which the vehicle itself is temporarily re-configured;

a thermal control status/mode, in which at least one of a battery pack temperature, an inverter temperature, a motor temperature, a service fluid temperature, or a gearbox temperature is less than or equal to or greater than a respective threshold value;

a high speed status/mode, in which the aggregated command outputs are configured to generate a lowest aerodynamic drag on the vehicle or reach a maximum practical speed of the vehicle, and the lowest aerodynamic drag comprises a front aerodynamic drag and a rear aerodynamic drag while the downforce is being mutually balanced on a front axle of the vehicle and on a rear axle of the vehicle;

a DRS status/mode, in which the vehicle is configured to generate a lower overall aerodynamic drag for a predetermined amount of time, the lower aerodynamic drag comprises a front aerodynamic drag and a rear aerodynamic drag while the downforce is being mutually balanced on a front axle of the vehicle and on a rear axle of the vehicle;

a stability status/mode, in which the set of command parameters are configured to minimize a vehicle reaction or dynamic feedback to an environmental disturbance or a user disturbance while the vehicle is moving;

an efficiency status/mode, in which the set of command parameters are configured to maximize a range of the vehicle or minimize a energy consumption of the vehicle;

a cruise user/driver defined status/mode, in which the set of command parameters are configured to maintain a cruising speed of the vehicle;

a maximum maneuvering mode, in which the set of command parameters are configured to maximize at least one of a responsiveness of the vehicle to a user/driver's inputs, a mechanical grip between at least one wheel and a surface run over by the vehicle during movement, a rotational speed around a yaw axis of the vehicle, or a aerodynamic downforce acting on the vehicle during movement;

a drift user/driver defined status/mode, in which the set of command parameters are configured to maintain a controlled sliding of a rear axle and/or a front axle of the vehicle;

an autonomous drive status/mode, in which the aggregated command outputs are controlled by the autonomous guidance system;

a custom user/driver defined status/mode, in which one or more of the set of command parameters are selectively determined by the user/driver; and a track and/or racetrack user/driver defined status/mode, in which the set of command parameters are configured to maximize a dynamic performance of the vehicle along a given path or circuit.

3. The vehicle of claim 1, wherein the dynamic parameters comprise:

a longitudinal speed of the vehicle;

a rotational speed or rotational acceleration of at least one wheel of the vehicle;

a difference between rotational speeds or rotational accelerations of at least two wheels of the vehicle, wherein the two wheels belong to a front axle or to a rear axle of the vehicle;

a steering angle of at least one wheel of the vehicle;

a steering angle command input imparted by a user of the vehicle;

a static or a dynamic toe angle of at least one wheel of the vehicle;

a static or a dynamic camber angle of at least one wheel of the vehicle;

a static or a dynamic caster angle of at least one wheel of the vehicle;

a static or a dynamic Ackermann angle of at least one wheel of the vehicle, wherein the static or dynamic Ackermann angle being measured at a steering wheel of the vehicle;

a pressure of a tire mounted on a wheel of the vehicle;

an operating index of at least a suspension linked to a wheel of the vehicle, wherein the operating index comprises a value of elastic load or preload of the suspension, or a value of hydraulic/viscous resistance in a compression or rebound direction of travel of the suspension;

a ride height of the vehicle with respect to the ground;

an output power, an output torque, a number of revolutions per minute of the at least one engine or powertrain of the vehicle;

a real-time front height or a real-time rear height;

a real-time travelling speed of the vehicle;

a longitudinal acceleration or deceleration of the vehicle in a travelling direction or along a longitudinal axis of the vehicle;

a steering angle output resulting at front wheels of the vehicle;

a steering angle input resulting at a steering command of the vehicle;

a temperature of a battery pack, an inverter, a motor, a service fluid, or a gearbox of the vehicle;

a rotational speed of the vehicle around a pitch axis;

a rotational acceleration of the vehicle around the pitch axis;

a linear variation ratio, over time, of the front height or the rear height of the vehicle along a pitching direction, wherein the pitching direction is substantially perpendicular to the ground;

a longitudinal acceleration of the front height the rear height of the vehicle along the pitching direction; and an input command given by a user of the vehicle to the driving input interface.

4. The vehicle of claim 1, wherein the driving input interface comprises at least one or more of the following:

a steering command;

an accelerator pedal or a brake pedal;

a gearbox selector;

a driving mode selector;

a ride height selector;

a suspension setting selector;

an aerodynamic status or mode selector;

a power level selector or a torque level selector; and a regenerative or hybrid powertrain mode selector.

5. The vehicle of claim 1, wherein the aggregated command outputs correspond to one or more of the following vehicle stati/modes:
a maximum longitudinal stability status/mode, in which movement around yaw and pitch axes of the vehicle are minimized or nullified;
a maximum lateral stability status/mode, in which movement around a roll axis of the vehicle are minimized or nullified;
a minimum understeer status/mode, in which front end grip of the vehicle is maximized;
a minimum oversteer status/mode, in which rear end grip of the vehicle is maximized;
a minimum ride height status/mode, in which a number of points of an underbody of the vehicle are maintained at a minimum value; and
a maximum ride height status/mode wherein the number of points of the underbody of the vehicle are maintained at a maximum value.

6. The vehicle of claim 1, wherein the plurality of onboard systems comprise at least one or more of the following:
a front end height or rear end height controller configured to set at least at a front height or a rear height of the vehicle with respect to a travelling ground in a condition of travel at a given constant speed of the chassis;
a suspension system configured to define a vehicle setup comprising one or more preload values of spring elements associated to each wheel and one or more hydraulic or viscous damping forces acting on each wheel;
a steering system configured to define a steering direction of at least one wheel and at least one steering axle;
an engine or powertrain management system configured to define a revving range, a torque, a power, or a regenerative capability of the at least one engine or powertrain; and
an aerodynamic force generator configured to define a lift and drag force distribution on the vehicle.

7. The vehicle of claim 6, wherein the aerodynamic force generator comprises at least one or more of the following:
a front aero assembly disposed at a front end of the vehicle and configured to generate a front aerodynamic force on the vehicle;
a rear aero assembly disposed at a rear end of the vehicle and configured to generate a rear aerodynamic force on the vehicle; and
at least one side aero assembly disposed at one side of the vehicle and configured to generate a side aerodynamic force on the vehicle.

8. The vehicle of claim 1, wherein the one or more controllers comprise:
at least one sensor configured to measure one or more of the dynamic parameters;
a processor configured to receive the dynamic parameters and send the set of command parameters to each of the plurality of the onboard systems; and
at least one actuator configured to control motion of the vehicle based on the driving mode corresponding to the set of command parameters received by the plurality of onboard systems.

9. The vehicle of claim 8, wherein the at least one actuator is configured to reversibly change between the user-selected driving mode and a prioritized one of the plurality of safety driving modes based on the set of command parameters received by the plurality of onboard systems.

10. The vehicle of claim 1, wherein the set of command parameters comprise one or more of the following:

24 an adjustment angle;
a displacement, translation, rotation distance;
a geometric or spatial configuration;
a value of a resistance force;
a value of a aiding force;
a value of energy consumption or absorption;
a value of energy release or output; and
a vehicle travelling speed.

11. A method of controlling a vehicle, wherein the vehicle comprises: a chassis supporting wheels, at least one of the wheels being a driving wheel and at least one of the wheels being a maneuvering wheel; at least one engine or powertrain supported by the chassis and linked to the driving wheel and/or to a driving axle; a plurality of onboard systems dedicated to motion control of the vehicle and/or to determine or affect dynamic parameters of the vehicle during its movement, the plurality of onboard systems including an active aerodynamics system configured to alter an aerodynamic state of the vehicle during movement of the vehicle; and a driving input interface interfaceable with a user of the vehicle or with an autonomous guidance system, the method comprising:
determining aggregated command outputs, each of the aggregated command outputs comprising a set of command parameters that control the plurality of onboard systems, the driving input interface, the at least one engine or powertrain, wheels, and chassis, wherein each set of command parameters corresponds to a driving mode, including user-selected driving mode and a plurality of safety driving modes;
detecting one or more dynamic parameters including: a current vehicle movement, overall status, and/or condition;
selectively prioritizing each of the aggregated command outputs based on one or more of the dynamic parameters exceeding a threshold safety value, one or more vehicle command parameters of the set of command parameters being changed according to a prioritization of the aggregated command outputs to change from a user-selected driving mode to one of the plurality of safety driving modes; and
changing, in response to the one or more of the dynamic parameters no longer exceeding the threshold safety value, the one or more vehicle command parameters from the prioritized safety driving mode to the user-selected driving mode;
wherein when the vehicle is in the user-selected driving mode, the active aerodynamics system of the vehicle is in a first aerodynamic state;
wherein when the vehicle is in the prioritized safety driving mode, the active aerodynamics system is in a second aerodynamic state, the second aerodynamic state differing from the first aerodynamic state.

12. The method of claim 11, wherein the prioritization of the aggregated command outputs comprises one or more of the following vehicle stati/modes, provided in a decreasing priority value sequence:
a failure status/mode, in which one or more the dynamic parameters exceed a respective safety threshold value, wherein the aggregated command outputs are configured to adjust the set of command parameters to bring the vehicle to a dynamic condition of at least one of maximum stability, minimum or zero acceleration, minimum or zero travelling speed, minimum or zero torque output, or minimum heat generation;
an airbrake status/mode, in which at least a vehicle speed is equal to or greater than a given threshold speed and/or wherein the vehicle is temporarily adapted to generate a higher aerodynamic drag and aerodynamic downforce, the aerodynamic drag being an overall aerodynamic drag or a front aerodynamic drag on a front axle of the vehicle or a rear aerodynamic drag on a rear axle of the vehicle, within a predetermined amount of time and with respect to a status/mode from which the vehicle itself is temporarily re-configured;
a thermal control status/mode, in which at least one of a battery pack temperature, an inverter temperature, a motor temperature, a service fluid temperature, or a gearbox temperature is less than or equal to or greater than a respective threshold value;
a high speed status/mode, in which the aggregated command outputs are configured to generate a lowest aerodynamic drag on the vehicle or reach a maximum practical speed of the vehicle, and the lowest aerodynamic drag comprises a front aerodynamic drag and a rear aerodynamic drag while the downforce is being mutually balanced on a front axle of the vehicle and on a rear axle of the vehicle;
a DRS status/mode, in which the vehicle is configured to generate a lower overall aerodynamic drag for a predetermined amount of time, the lower aerodynamic drag comprises a front aerodynamic drag and a rear aerodynamic drag while the downforce is being mutually balanced on a front axle of the vehicle and on a rear axle of the vehicle;
a stability status/mode, in which the set of command parameters are configured to minimize a vehicle reaction or dynamic feedback to an environmental disturbance or a user disturbance while the vehicle is moving;
an efficiency status/mode, in which the set of command parameters are configured to maximize a range of the vehicle or minimize a energy consumption of the vehicle;
a cruise user/driver defined status/mode, in which the set of command parameters are configured to maintain a cruising speed of the vehicle;
a maximum maneuvering mode, in which the set of command parameters are configured to maximize at least one of a responsiveness of the vehicle to a user/driver's inputs, a mechanical grip between at least one wheel and a surface run over by the vehicle during movement, a rotational speed around a yaw axis of the vehicle, or a aerodynamic downforce acting on the vehicle during movement;
a drift user/driver defined status/mode, in which the set of command parameters are configured to maintain a controlled sliding of a rear axle and/or a front axle of the vehicle;
an autonomous drive status/mode, in which the aggregated command outputs are controlled by the autonomous guidance system;
a custom user/driver defined status/mode, in which one or more of the set of command parameters are selectively determined by the user/driver; and
a track and/or racetrack user/driver defined status/mode, in which the set of command parameters are configured to maximize a dynamic performance of the vehicle along a given path or circuit.
13. The method of claim 11, wherein the dynamic parameters comprise:
a longitudinal speed of the vehicle;
a rotational speed or rotational acceleration of at least one wheel of the vehicle;

a difference between rotational speeds or rotational accelerations of at least two wheels of the vehicle, wherein the two wheels belong to a front axle or to a rear axle of the vehicle;
a steering angle of at least one wheel of the vehicle;
a steering angle command input imparted by a user of the vehicle;
a static or a dynamic toe angle of at least one wheel of the vehicle;
a static or a dynamic camber angle of at least one wheel of the vehicle;
a static or a dynamic caster angle of at least one wheel of the vehicle;
a static or a dynamic Ackermann angle of at least one wheel of the vehicle, wherein the static or dynamic Ackermann angle being measured at a steering wheel of the vehicle;
a pressure of a tire mounted on a wheel of the vehicle;
an operating index of at least a suspension linked to a wheel of the vehicle, wherein the operating index comprises a value of elastic load or preload of the suspension, or a value of hydraulic/viscous resistance in a compression or rebound direction of travel of the suspension;
a ride height of the vehicle with respect to the ground;
an output power, an output torque, a number of revolutions per minute of the at least one engine or powertrain of the vehicle;
a real-time front height or a real-time rear height;
a real-time travelling speed of the vehicle;
a longitudinal acceleration or deceleration of the vehicle in a travelling direction or along the longitudinal axis of the vehicle;
a steering angle output resulting at front wheels of the vehicle;
a steering angle input resulting at a steering command of the vehicle;
a temperature of a battery pack, an inverter, a motor, a service fluid, or a gearbox of the vehicle;
a rotational speed of the vehicle around a pitch axis;
a rotational acceleration of the vehicle around the pitch axis;
a linear variation ratio, over time, of the front height or the rear height of the vehicle along a pitching direction, wherein the pitching direction is substantially perpendicular to the ground;
a longitudinal acceleration of the front height the rear height of the vehicle along the pitching direction; and
an input command given by a user of the vehicle to the driving input interface.
14. The method of claim 11, wherein the driving input interface comprises at least one or more of the following:
a steering command;
an accelerator pedal or a brake pedal;
a gearbox selector;
a driving mode selector;
a ride height selector;
a suspension setting selector;
an aerodynamic status or mode selector;
a power level selector or a torque level selector; and
a regenerative or hybrid powertrain mode selector.
15. The method of claim 11, wherein the aggregated command outputs correspond to one or more of the following vehicle stati/modes:
a maximum longitudinal stability status/mode, in which movement around yaw and pitch axes of the vehicle are minimized or nullified;

a maximum lateral stability status/mode, in which movement around a roll axis of the vehicle are minimized or nullified;

a minimum understeer status/mode, in which front end grip of the vehicle is maximized;

a minimum oversteer status/mode, in which rear end grip of the vehicle is maximized;

a minimum ride height status/mode, in which a number of points of an underbody of the vehicle are maintained at a minimum value; and a maximum ride height status/mode wherein the number of points of the underbody of the vehicle are maintained at a maximum value.

16. The method of claim 11, wherein the plurality of onboard systems comprise at least one or more of the following:

a front end height or rear end height controller configured to set at least at a front height or a rear height of the vehicle with respect to a travelling ground in a condition of travel at a given constant speed of the chassis;

a suspension system configured to define a vehicle setup comprising one or more preload values of spring elements associated to each wheel and one or more hydraulic or viscous damping forces acting on each wheel;

a steering system configured to define a steering direction of at least one wheel and at least one steering axle;

an engine or powertrain management system configured to define a revving range, a torque, a power, or a regenerative capability of the at least one engine or powertrain; and an aerodynamic force generator configured to define a lift and drag force distribution on the vehicle.

17. The method of claim 16, wherein the aerodynamic force generator comprises at least one or more of the following:

a front aero assembly disposed at a front end of the vehicle and configured to generate a front aerodynamic force on the vehicle;

a rear aero assembly disposed at a rear end of the vehicle and configured to generate a rear aerodynamic force on the vehicle; and at least one side aero assembly disposed at one side of the vehicle and configured to generate a side aerodynamic force on the vehicle.

18. The method of claim 11, wherein the method further comprises:

reversibly changing the one or more vehicle command parameters between the user-selected driving mode and a prioritized one of the plurality of safety driving modes.

19. The method of claim 11, wherein the set of command parameters comprise one or more of:

an adjustment angle;

a displacement, translation, rotation distance;

a geometric or spatial configuration;

a value of a resistance force;

a value of a aiding force;

a value of energy consumption or absorption;

a value of energy release or output; and a vehicle travelling speed.

20. A non-transitory computer readable storage medium configured to store instructions that, when executed by one or more processors, cause the one or more processors to:

control a vehicle, wherein the vehicle comprises: a chassis supporting wheels, at least one of the wheels being a driving wheel and at least one of the wheels being a maneuvering wheel; at least one engine or powertrain supported by the chassis and linked to the driving wheel and/or to a driving axle; a plurality of onboard systems dedicated to motion control of the vehicle and/or to determine or affect dynamic parameters of the vehicle during its movement, the plurality of onboard systems including an active aerodynamics system configured to alter an aerodynamic state of the vehicle during movement of the vehicle; and a driving input interface interfaceable with a user of the vehicle or with an autonomous guidance system;

determine aggregated command outputs, each of the aggregated command outputs comprising a set of command parameters that control the plurality of onboard systems, the driving input interface, the at least one engine or powertrain, wheels, and chassis, wherein each set of command parameters corresponds to a driving mode, including user-selected driving mode and a plurality of safety driving modes;

detect one or more dynamic parameters including: a current vehicle movement, overall status, and/or condition;

selectively prioritize each of the aggregated command outputs based on one or more of the dynamic parameters exceeding a threshold safety value, one or more vehicle command parameters of the set of command parameters being changed according to a prioritization of the aggregated command outputs to change from a user-selected driving mode to one of the plurality of safety driving modes; and change, in response to the one or more of the dynamic parameters no longer exceeding the threshold safety value, the one or more vehicle command parameters from the prioritized safety driving mode to the user-selected driving mode;

wherein when the vehicle is in the user-selected driving mode, the active aerodynamics system of the vehicle is in a first aerodynamic state;

wherein when the vehicle is in the prioritized safety driving mode, the active aerodynamics system is in a second aerodynamic state, the second aerodynamic state differing from the first aerodynamic state.

* * * * *